(12) United States Patent
Osaki et al.

(10) Patent No.: US 10,618,762 B2
(45) Date of Patent: Apr. 14, 2020

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Takahiro Osaki, Aichi-ken (JP); Takamasa Sato, Aichi-ken (JP); Yuya Nagata, Aichi-ken (JP); Tomonari Umakoshi, Aichi-ken (JP); Takuhiro Saito, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 188 days.

(21) Appl. No.: 15/889,908

(22) Filed: Feb. 6, 2018

(65) Prior Publication Data
US 2018/0237246 A1 Aug. 23, 2018

(30) Foreign Application Priority Data

Feb. 20, 2017 (JP) ................. 2017-029343

(51) Int. Cl.
*B60R 22/46* (2006.01)
*B65H 18/10* (2006.01)
*B60R 22/44* (2006.01)

(52) U.S. Cl.
CPC ............. *B65H 18/10* (2013.01); *B60R 22/46* (2013.01); *B60R 2022/4466* (2013.01); *B60R 2022/468* (2013.01); *B60R 2022/4666* (2013.01); *B65H 2403/722* (2013.01)

(58) Field of Classification Search
CPC ... B60R 22/34; B60R 22/46; B60R 2022/468; B60R 2022/4466; B60R 2022/4666; B65H 18/10
See application file for complete search history.

(56) References Cited

U.S. PATENT DOCUMENTS

| | | |
|---|---|---|
| 2005/0224621 A1 | 10/2005 | Mori |
| 2013/0341451 A1 | 12/2013 | Saito et al. |
| 2016/0244020 A1* | 8/2016 | Umakoshi ............... B60R 22/46 |
| 2016/0347277 A1 | 12/2016 | Nagata et al. |

FOREIGN PATENT DOCUMENTS

| | | |
|---|---|---|
| JP | 2014-004853 A | 1/2014 |
| JP | 2016-222005 A | 12/2016 |

* cited by examiner

*Primary Examiner* — Sang K Kim
(74) *Attorney, Agent, or Firm* — Roberts Calderon Safran & Cole P.C.

(57) ABSTRACT

A webbing take-up device that includes: a cut-off section that cuts off transmission of rotation load along a rotation force transmission route from a second rotation force transmission mechanism to a spool via a first rotation force transmission mechanism due to the rotation load in a pull-out direction becoming a predetermined value or greater; and a resistance section that resists the rotation load during transmission of the rotation load, and that suppresses transmission of the rotation load along the rotation force transmission route in a case in which the rotation load is less than the predetermined value.

4 Claims, 4 Drawing Sheets

WEBBING TAKE-UP DEVICE

CROSS-REFERENCE TO RELATED APPLICATION

This application is based on and claims priority under 35 USC 119 from Japanese Patent Application No. 2017-029343 filed on Feb. 20, 2017, the disclosure of which is incorporated by reference herein.

BACKGROUND

Technical Field

The present disclosure relates to a webbing take-up device capable of rotating a spool in a take-up direction when a motor is driven.

Related Art

Webbing take-up devices exist in which two rotation force transmission route systems, namely a forward drive force transmission section and a reverse drive force transmission section, are provided between a motor and a spool. When the motor is driven forward, the spool is rotated in the take-up direction at high speed, and when the motor is driven in reverse, the spool is rotated in the take-up direction at low speed (see Japanese Patent Application Laid-Open (JP-A) No. 2014-4853).

In a webbing take-up device configured in this manner, when, for example, the spool is rotated in a pull-out direction in a state in which a friction clutch configuring the reverse drive force transmission section is capable of transmitting rotation force, there is a possibility that pull-out direction rotation force of the spool might be transmitted and output to the forward drive force transmission section via the reverse drive force transmission section.

SUMMARY

In consideration of the above circumstances, an object of the present disclosure is to obtain a webbing take-up device capable of suppressing pull-out direction rotation force of a spool from being transmitted and output to a first rotation force transmission section via a second rotation force transmission section.

A webbing take-up device of an aspect includes: a spool that takes up a webbing by rotating in a take-up direction, and that rotates in a pull-out direction opposite to the take-up direction by the webbing being pulled out; a motor that rotates a motor output shaft by driving; a first rotation force transmission mechanism that is capable of transmitting rotation force between the motor output shaft and the spool, and that is capable of rotating the spool in the take-up direction by being input with rotation force of the motor output shaft in a first direction; a second rotation force transmission mechanism that is capable of transmitting rotation force between the motor output shaft and the spool, and that is capable of rotating the spool in the take-up direction by being input with rotation force of the motor output shaft in a second direction opposite to the first direction; a cut-off section that cuts off transmission of rotation load along a rotation force transmission route from the second rotation force transmission mechanism to the spool via the first rotation force transmission mechanism due to the rotation load in the pull-out direction becoming a predetermined value or greater; and a resistance section that resists the rotation load during transmission of the rotation load, and that suppresses transmission of the rotation load along the rotation force transmission route in a case in which the rotation load is less than the predetermined value.

BRIEF DESCRIPTION OF THE DRAWINGS

Exemplary embodiments of the present invention will be described in detail based on the following figures, wherein.

DETAILED DESCRIPTION

Figure 1:
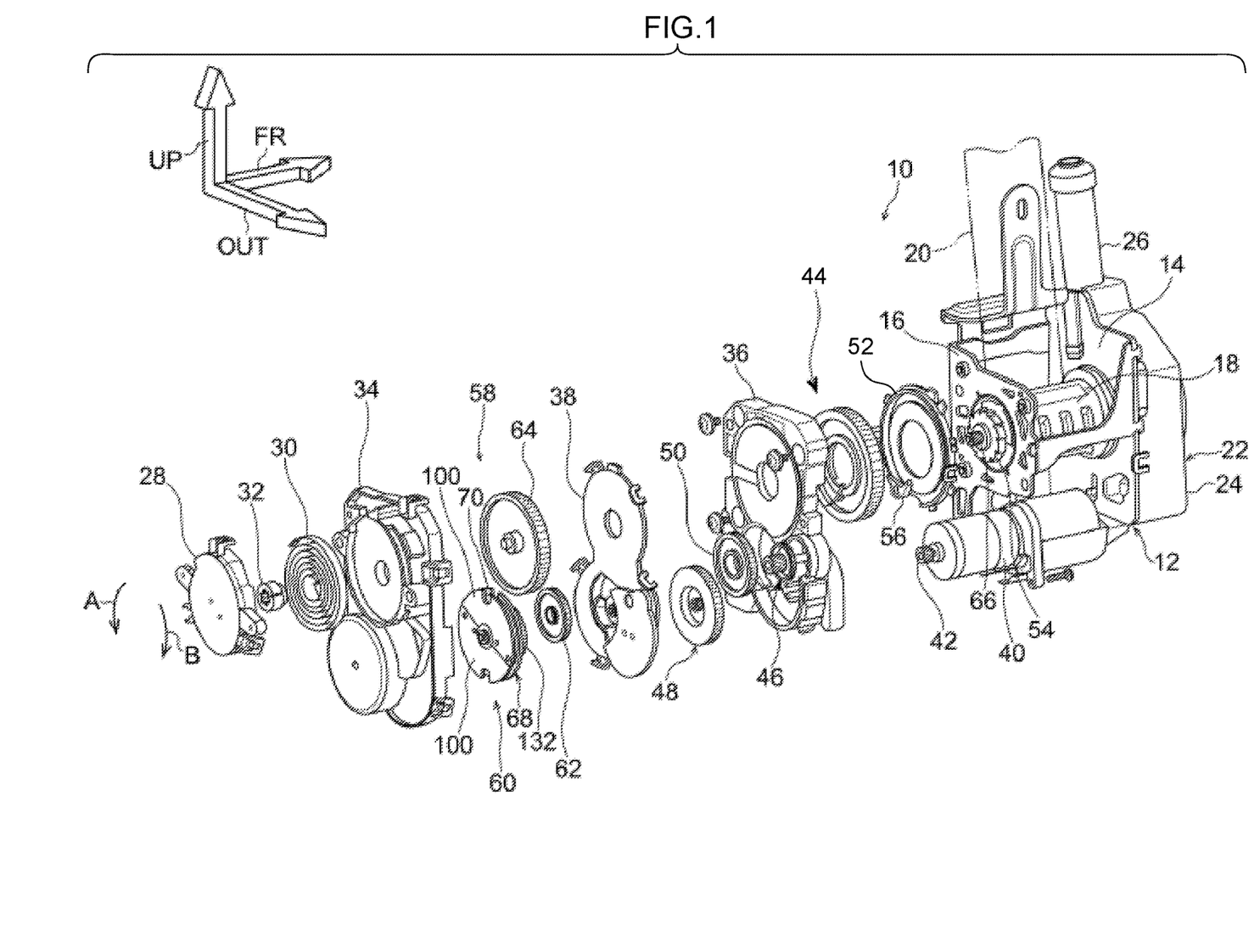
FIG. 1 is an exploded perspective view illustrating a webbing take-up device according to an exemplary embodiment of the present disclosure.

Explanation follows regarding an exemplary embodiment of the present disclosure, with reference to FIG. 1 to FIG. 4C. In the drawings, arrow FR indicates the front side of a vehicle in which a webbing take-up device 10 is installed, arrow OUT indicates the vehicle width direction outside, and the arrow UP indicates the vehicle upper side. In FIG. 1, arrow A indicates a take-up direction, this being one rotation direction of a spool 18 of the webbing take-up device 10, and arrow B indicates a pull-out direction opposite to the take-up direction.

Configuration of the Present Exemplary Embodiment

As illustrated in FIG. 1, the webbing take-up device 10 according to the present exemplary embodiment includes a frame 12. The frame 12 is fixed to a vehicle lower side portion of a center pillar, serving as a vehicle body of a vehicle. The frame 12 includes leg plates 14, 16. The leg plate 14 and the leg plate 16 face each other substantially in a vehicle front-rear direction.

The webbing take-up device 10 is provided with the spool 18. The spool 18 is formed in a substantially circular cylinder shape, and is disposed between the leg plate 14 and the leg plate 16 of the frame 12. An axial center direction of the spool 18 runs in the direction in which the leg plate 14 and the leg plate 16 face each other (namely, substantially in the vehicle front-rear direction). The spool 18 is capable of rotating about its axial center.

A length direction base end portion of an elongated strap-shaped webbing 20 is anchored to the spool 18. When the spool 18 is rotated in the take-up direction, the webbing 20 is taken up onto the spool 18 from the length direction base end side. A length direction leading end side of the webbing 20 extends from the spool 18 toward the vehicle upper side. The length direction leading end side of the webbing 20 passes through a slit formed in a through-anchor supported by the center pillar at the vehicle upper side of the frame 12, such that the webbing 20 turns back toward the vehicle lower side.

Moreover, a length direction leading end portion of the webbing 20 is anchored to an anchor plate. The anchor plate is formed by a metal plate configured from steel or the like, and is fixed to a vehicle floor, a framework member of a seat applied with the webbing take-up device 10, or the like.

A vehicle seatbelt device to which the webbing take-up device 10 is applied includes a buckle device. The buckle device is provided at the vehicle width direction inside of the seat applied with the webbing take-up device 10. The webbing 20 is worn over the body of an occupant by engaging a tongue provided to the webbing 20 with the buckle device, in a state in which the webbing 20 is wrapped across the body of the occupant sitting on the seat.

A cover member 24 configuring a lock mechanism 22 is provided at a vehicle front side of the leg plate 14 of the frame 12. Various components configuring a VSIR mechanism and a WSIR mechanism are provided inside the cover member 24. The VSIR mechanism actuates in a state in which the vehicle decelerates suddenly, such as in a vehicle collision. The WSIR mechanism actuates when rotational acceleration of the spool 18 in the pull-out direction exceeds a predetermined magnitude. Actuating the VSIR mechanism or the WSIR mechanism actuates a lock member configuring the lock mechanism 22, thereby limiting pull-out direction rotation of the spool 18.

A pre-tensioner 26 is provided at the vehicle front side of the leg plate 14. The pre-tensioner 26 is actuated in a vehicle emergency such as a vehicle collision. Actuation of the pre-tensioner 26 forcibly rotates the spool 18 in the take-up direction. The spool 18 is also provided with a force limiter mechanism. When pull-out direction rotation force of the spool 18 exceeds a predetermined value in a state in which pull-out direction rotation of the spool 18 is being blocked by the lock member of the lock mechanism 22, the spool 18 rotates in the pull-out direction as an energy absorption member of the force limiter mechanism deforms. The webbing 20 is pulled out from the spool 18 by an amount corresponding to the pull-out direction rotation of the spool 18, and some of the rotation force on the spool 18 is absorbed in deformation of the energy absorption member.

A spring housing 28 is provided at the vehicle rear side of the leg plate 16 of the frame 12. A flat spiral spring 30, serving as a spool urging section, is provided inside the spring housing 28. A coil direction outside end portion of the flat spiral spring 30 is directly or indirectly anchored to the spring housing 28. A shaft member 32 is provided inside the spring housing 28, and a coil direction inside end portion of the flat spiral spring 30 is directly or indirectly anchored to the shaft member 32. The shaft member 32 is disposed coaxially to the spool 18, and is rotatably supported by the spring housing 28.

A first gear housing 34 is provided between the spring housing 28 and the leg plate 16 of the frame 12. The spring housing 28 is supported by the first gear housing 34. A second gear housing 36 is provided between the first gear housing 34 and the leg plate 16 of the frame 12. The second gear housing 36 is fixed to the leg plate 16 of the frame 12 by fastening members such as screws. The first gear housing 34 is supported by the leg plate 16 or the second gear housing 36. A plate 38 is provided between the first gear housing 34 and the second gear housing 36. The plate 38 is supported by the first gear housing 34.

The webbing take-up device 10 also includes a motor 40 serving as a resistance section. The motor 40 is provided at the vehicle lower side of the spool 18, between the leg plate 14 and the leg plate 16 of the frame 12. The motor 40 is electrically connected to an on-board battery, and is also electrically connected to an ECU, serving as a control unit. The ECU is electrically connected to a forward monitoring device that monitors in front of the vehicle.

In the forward monitoring device, for example, electromagnetic waves emitted toward the front of the vehicle by a millimeter-wave radar or the like are reflected by obstacles and the like ahead of the vehicle and are received by the forward monitoring device. The forward monitoring device computes distances from the vehicle to obstacles ahead of the vehicle. In cases in which the distance from the vehicle to an obstacle ahead of the vehicle computed in this manner is below a predetermined value, an obstacle detection signal output from the forward monitoring device to the ECU is switched from a LOW level to a HIGH level. When the obstacle detection signal input to the ECU switches from a LOW level to a HIGH level, the ECU drives the motor 40 forward at high speed.

The ECU is electrically connected to a buckle switch. The buckle switch is provided to the buckle configuring the seatbelt device. When the tongue is engaged with the buckle, a tongue detection signal output from the buckle switch to the ECU switches from a LOW level to a HIGH level. When the engagement between the tongue and the buckle is released, the tongue detection signal output from the buckle switch switches from the HIGH level to the LOW level. When the tongue detection signal input to the ECU switches from the LOW level to the HIGH level, the ECU drives the motor 40 forward at low speed. Conversely, when the tongue detection signal input to the ECU switches from the HIGH level to the LOW level, the ECU drives the motor 40 in reverse.

An output shaft 42 of the motor 40 extends from a main body portion of the motor 40 toward the vehicle rear side. The output shaft 42 of the motor 40 passes through the leg plate 16 of the frame 12 so as to enter the second gear housing 36.

The webbing take-up device 10 also includes a first gear train 44 configuring a first transmission route, serving as a first rotation force transmission unit. The first gear train 44 includes a first gear 46, a first clutch 48, a second gear 50, and a second clutch 52. The first gear 46, the first clutch 48, the second gear 50, and the second clutch 52 are rotatably provided inside the second gear housing 36. The first gear 46 of the first gear train 44 is engaged with the output shaft 42 of the motor 40. When the motor 40 is driven such that rotation force of the motor 40 is input to the first gear 46 through the output shaft 42, the rotation force of the motor 40 is transmitted through the first gear 46, the first clutch 48, and the second gear 50 to the second clutch 52, thereby rotating the second clutch 52.

The second clutch 52 of the first gear train 44 is disposed coaxially to the spool 18. A ratchet wheel 54 is provided inside the second clutch 52 of the first gear train 44. The ratchet wheel 54 is disposed coaxially to the spool 18 and the second clutch 52. The ratchet wheel 54 rotates as a unit with the spool 18, and is capable of rotating relative to the second clutch 52.

The second clutch 52 of the first gear train 44 also includes a clutch pawl 56. When the motor 40 is driven so as to rotate forward, the rotation force of the motor 40 is transmitted to the second clutch 52, such that a main body portion of the second clutch 52 is rotated in the take-up direction. When this occurs, the clutch pawl 56 is rotated in the take-up direction together with the main body portion of the second clutch 52, and engages with the ratchet wheel 54. The ratchet wheel 54 thus rotates as a unit with the second clutch 52 in the take-up direction, thereby rotating the spool 18 in the take-up direction.

Due to the provision of the second clutch 52 in the first gear train 44, rotation force is not transmitted between the second clutch 52 and the ratchet wheel 54 when the second clutch 52 rotates in the pull-out direction, nor when the ratchet wheel 54 rotates in the take-up direction or the pull-out direction, in a state in which the clutch pawl 56 of the second clutch 52 is not engaged with the ratchet wheel 54.

However, in a state in which the clutch pawl 56 of the second clutch 52 of the first gear train 44 is engaged with the ratchet wheel 54, pull-out direction rotation of the ratchet wheel 54 is transmitted to the second clutch 52 through the clutch pawl 56. Note that when forward drive rotation force of the motor 40 is being transmitted through the first gear 46 to the first clutch 48, the first clutch 48 actuates when rotation force against the rotation of the first clutch 48 matching or exceeding a predetermined value is input from the second clutch 52 to the first clutch 48 through the second gear 50 of the first gear train 44. The first clutch 48 thus cuts off the transmission of rotation force between the first gear 46 and the second gear 50 of the first gear train 44.

The webbing take-up device 10 further includes a second gear train 58, serving as a second rotation force transmission unit. The second gear train 58 includes a third clutch 60 configuring a cut-off unit, serving as a friction clutch, a third gear 62, and a fourth gear 64. The third clutch 60, the third gear 62, and the fourth gear 64 are rotatably provided inside the first gear housing 34. The third clutch 60 of the second gear train 58 is engaged with the first clutch 48 of the first gear train 44, and rotation force of the first clutch 48 is capable of being transmitted not only to the second gear 50 but also to the third clutch 60. Rotation force transmitted to the third clutch 60 is also capable of being transmitted to the fourth gear 64 through the third gear 62.

The fourth gear 64 is disposed coaxially to the spool 18, and is coupled to the shaft member 32 provided inside the spring housing 28. Relative rotation between the fourth gear 64 and the shaft member 32 is restricted. The fourth gear 64 is coupled to a coupling shaft 66. The coupling shaft 66 is provided on the opposite side of the ratchet wheel 54 to the spool 18 (on the vehicle rear side). The coupling shaft 66 is disposed coaxially to the ratchet wheel 54 and the spool 18. Relative rotation between the coupling shaft 66 and the spool 18 is restricted. Relative rotation between the coupling shaft 66 and the fourth gear 64 of the second gear train 58 is also limited. Rotation force is thereby transmitted between the spool 18 and the fourth gear 64.

Figure 2:
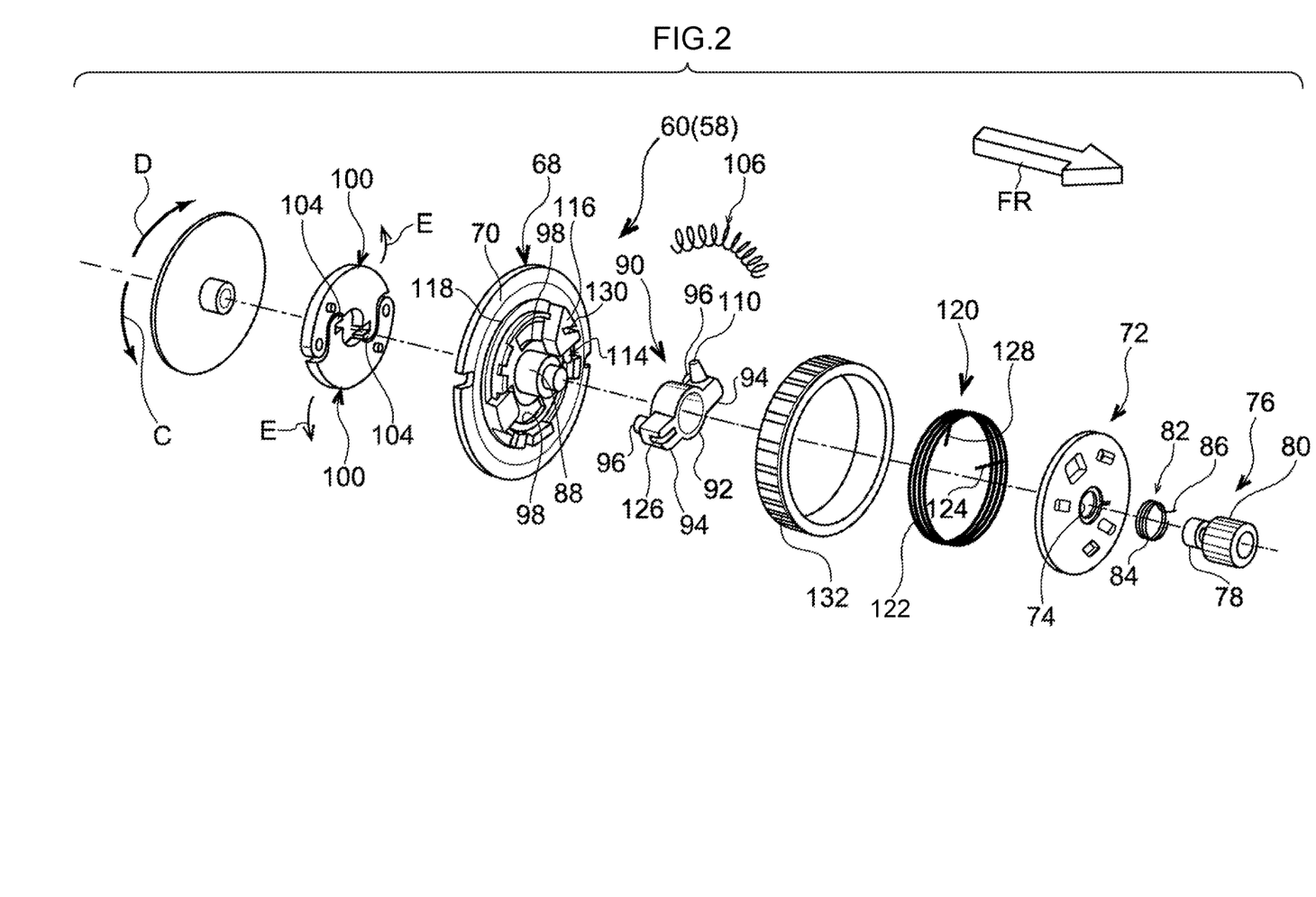
FIG. 2 is an exploded perspective view illustrating a third clutch of a second gear train from a vehicle front side.
Figure 3:
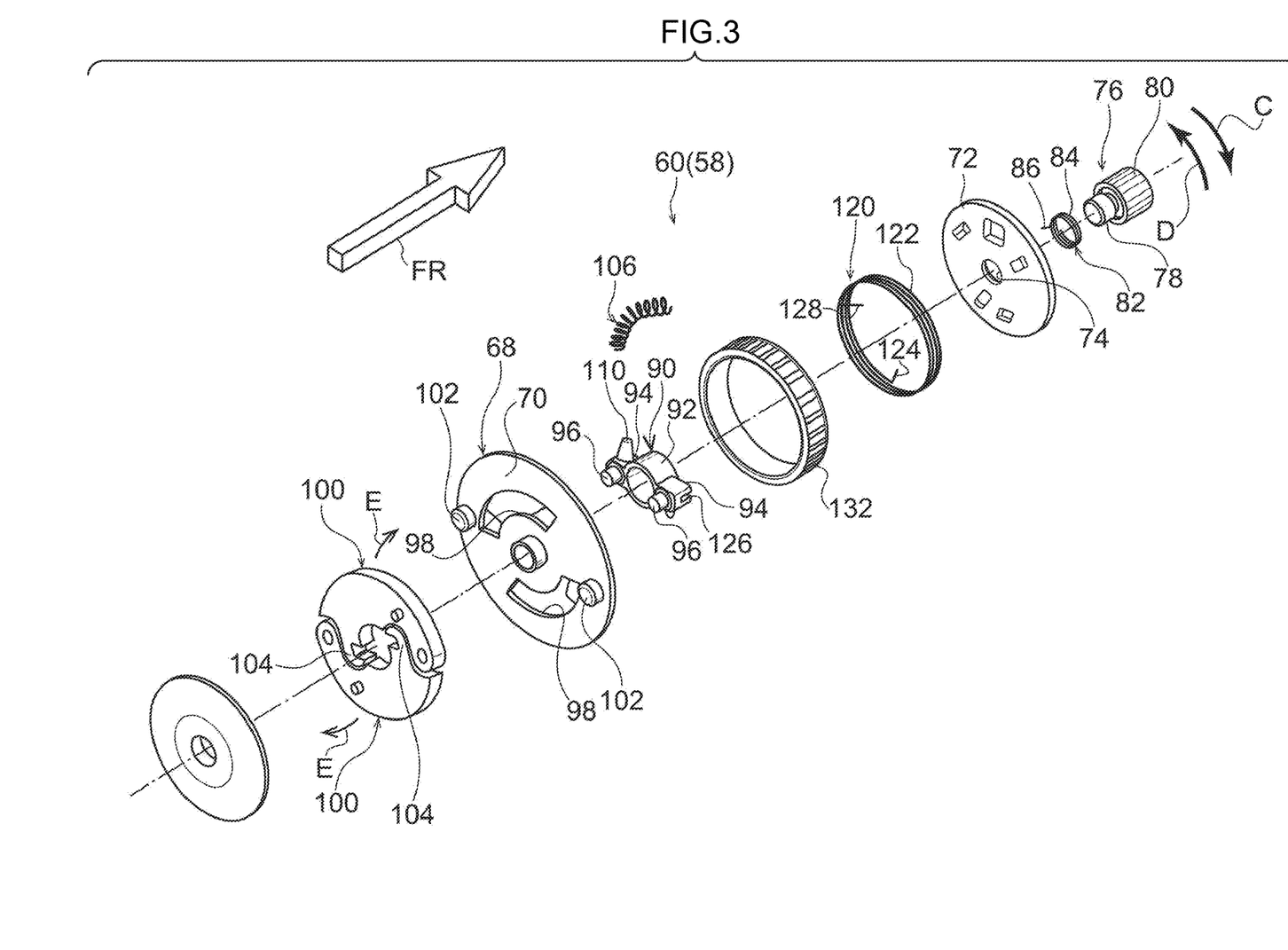
FIG. 3 is an exploded perspective view illustrating a third clutch of a second gear train from a vehicle rear side.

As illustrated in FIG. 2 and FIG. 3, the third clutch 60 includes a base 68. The base 68 is provided with a disc-shaped disc portion 70. A rotor plate 72 is provided at the vehicle front side of the disc portion 70. The rotor plate 72 is configured in a disc shape and is provided coaxially to the disc portion 70. The rotor plate 72 is coupled to the disc portion 70 at a position separated from the disc portion 70 toward the vehicle front side, and rotation of the rotor plate 72 relative to the disc portion 70, and movement of the rotor plate 72 in the vehicle front-rear direction relative to the disc portion 70, are limited.

A support hole 74 is formed substantially at the center of the rotor plate 72. A gear shaft 78 of an input gear 76 is inserted into the support hole 74 in the rotor plate 72. The input gear 76 is supported coaxially to the rotor plate 72 so as to be capable of rotating relative to the rotor plate 72. A gear portion 80 is provided at the vehicle front side of the gear shaft 78 of the input gear 76. The gear portion 80 is disposed coaxially to the gear shaft 78, and the gear portion 80 is configured integrally with the gear shaft 78.

The gear portion 80 of the input gear 76 is engaged with the first clutch 48 of the first gear train 44. Accordingly, when rotation force from forward drive of the motor 40 is transmitted through the first clutch 48 to the input gear 76, the input gear 76 is rotated toward one side about its axial center (the arrow C direction side in FIG. 2 and FIG. 3). When rotation force from reverse drive of the motor 40 is transmitted through the first clutch 48 to the input gear 76, the input gear 76 is rotated toward the other side about its axial center (the arrow D direction side in FIG. 2 and FIG. 3).

The input gear 76 is provided with a first clutch spring 82. The first clutch spring 82 is a coil spring. The gear shaft 78 of the input gear 76 is disposed inside a coil portion 84 of the first clutch spring 82. The coil portion 84 of the first clutch spring 82 contacts an outer peripheral face of the gear shaft 78 of the input gear 76. When the input gear 76 is rotated, friction between the gear shaft 78 of the input gear 76 and the coil portion 84 of the first clutch spring 82 causes the first clutch spring 82 to rotate together with the input gear 76. An engagement portion 86 extends from one end of the coil portion 84 of the first clutch spring 82. The engagement portion 86 of the first clutch spring 82 engages with the rotor plate 72. Rotation force of the input gear 76 is thereby transmitted through the first clutch spring 82 to the rotor plate 72, and also to the base 68.

A base shaft 88 is provided at the vehicle front side of the disc portion 70 of the base 68. The base shaft 88 is formed in a circular column shape, and is disposed coaxially to the disc portion 70. The base shaft 88 is configured integrally to the disc portion 70. The base shaft 88 is provided with a lever 90. The lever 90 is provided with a ring-shaped ring portion 92. The ring portion 92 is supported by the base shaft 88 so as to be capable of swinging toward one side (the arrow C direction side in FIG. 2 and FIG. 3) and the other side (the arrow D direction side in FIG. 2 and FIG. 3) about the base shaft 88. The ring portion 92 of the lever 90 is provided with a pair of lever portions 94 that are integral to the ring portion 92. One of the lever portions 94 is disposed at a radial direction outside of the ring portion 92, and the other lever portion 94 is disposed on the opposite side of the ring portion 92 to the one lever portion 94.

Engagement projections 96 are provided at the vehicle rear side of the lever portions 94 of the lever 90. The engagement projections 96 are formed in circular column shapes. Vehicle front side ends of the engagement projections 96 are connected to the lever portions 94 of the lever 90 so as to be integral to the lever portions 94. Moreover, the engagement projections 96 project toward the vehicle rear side of the disc portion 70 through the holes 98 formed in the disc portion 70 of the base 68.

A pair of weights 100 are provided at the vehicle rear side of the disc portion 70 of the base 68. The weights 100 are formed in plate shapes, and a thickness direction of the weights 100 runs in the vehicle front-rear direction. As illustrated in FIG. 3, a pair of support shafts 102 are provided at the vehicle rear side of the disc portion 70 of the base 68. The support shafts 102 are formed projecting toward the vehicle rear side from a vehicle rear side face of the disc portion 70 of the base 68 at locations in the vicinity of an outer peripheral portion of the disc portion 70. One of the support shafts 102 is disposed on the opposite side of the center of the disc portion 70 to the other support shaft 102.

One of the pair of weights 100 described above is supported on the one support shaft 102 of the disc portion 70 of the base 68, and is capable of swinging about the one support shaft 102. The other weight 100 is supported by the other support shaft 102 of the disc portion 70 of the base 68, and is capable of swinging about the other support shaft 102. The weights 100 therefore rotate together with the base 68, and the weights 100 also swing in one direction (the arrow E direction in FIG. 2 and FIG. 3) about the support shafts 102 due to centrifugal force arising due to the rotation of the base 68 toward the other side (the arrow D direction side in FIG. 2 and FIG. 3) about the base shaft 88.

The weights 100 are also formed with engagement hooks 104. The engagement hook 104 of the one weight 100 engages with the engagement projection 96 of the one lever portion 94 of the lever 90, and the engagement hook 104 of the other weight 100 engages with the engagement projection 96 of the other lever portion 94 of the lever 90. When the weights 100 swing about the respective support shafts 102 in the other direction (the arrow E direction in FIG. 2 and FIG. 3), the engagement projections 96 of the two lever portions 94 of the lever 90 are pulled by the engagement hooks 104 of the weights 100, thereby swinging the lever 90 toward the one side (the arrow C direction side in FIG. 2 and FIG. 3) about the base shaft 88.

Figure 4A:
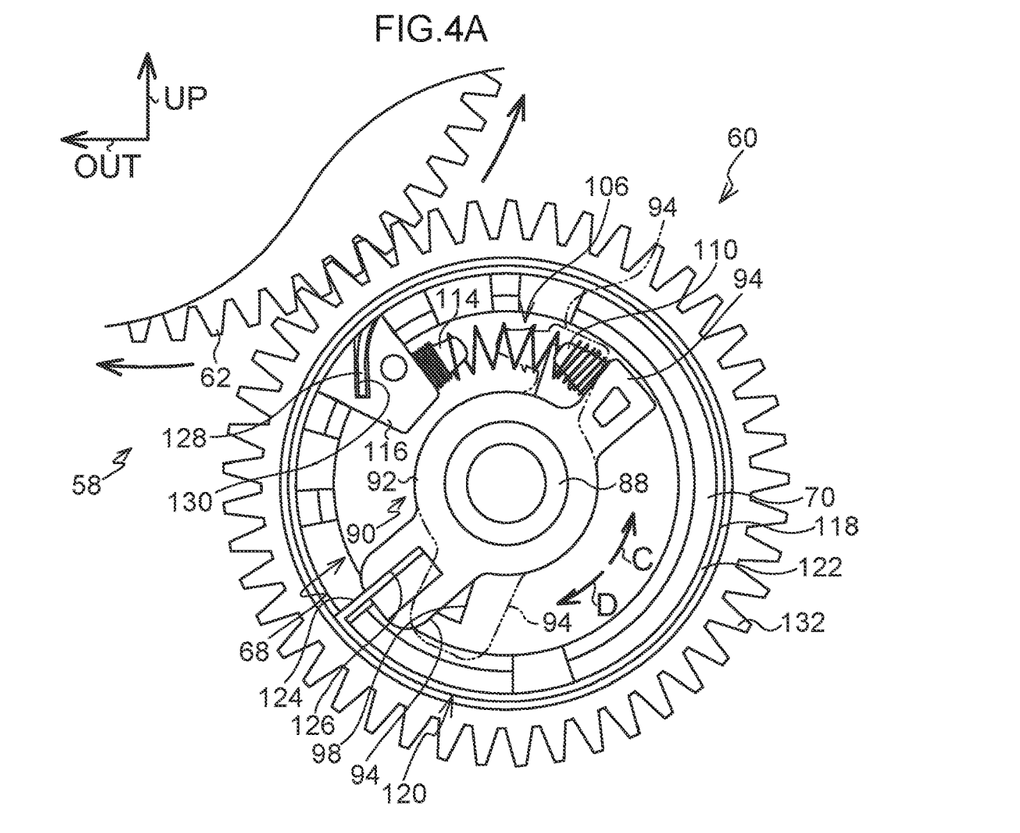
FIG. 4A is a side view of a third clutch of a second gear train, illustrating a base, a lever, a return spring, and a second clutch spring of the third clutch.
Figure 4B:
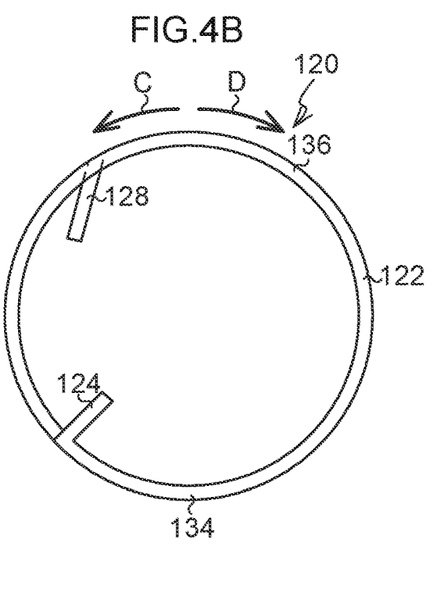
FIG. 4B is a side view illustrating a second clutch spring in a natural state.
Figure 4C:
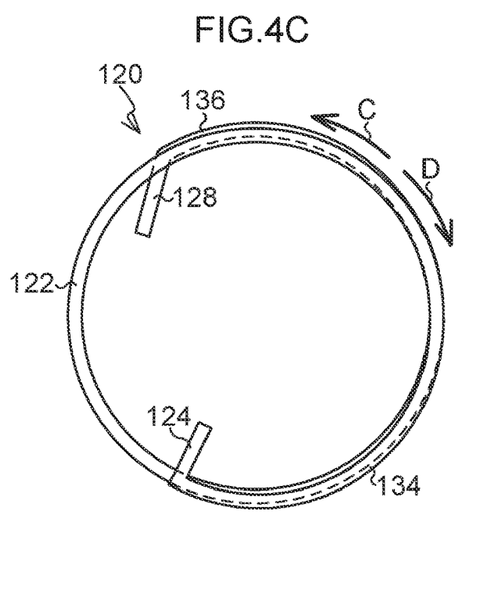
FIG. 4C is a side view illustrating a state in which one end portion of a second clutch spring has been swung in a direction of winding from one end portion to another end portion of a coil portion.

The base 68 is also provided with a return spring 106. The return spring 106 is configured by a compression coil spring, and is disposed at the vehicle front side of the disc portion 70 of the base 68. As illustrated in FIG. 4A, a first anchor projection 110 provided to the one lever portion 94 of the lever 90 is inserted inside one end portion of the return spring 106. The first anchor projection 110 is connected to a face of the one lever portion 94 of the lever 90 on the one side of the lever 90 about the base shaft 88 (the arrow C direction side in FIG. 4A), and is configured integrally to the one lever portion 94.

As illustrated in FIG. 4A, a second anchor projection 114 provided to the base 68 enters to the inside of another end portion of the return spring 106. The second anchor projection 114 is formed on a block 116 provided to the base 68. The block 116 is formed at the vehicle front side of the disc portion 70 of the base 68. The second anchor projection 114 is connected to a face of the block 116 on the other side about the base shaft 88 (the arrow D direction side in FIG. 4A), and is configured integrally to the block 116. Due to providing the return spring 106 in this manner, the lever 90 is urged toward the other side about the base shaft 88 with respect to the disc portion 70 of the base 68, and the lever 90 is capable of swinging toward the one side about the base shaft 88 (the arrow C direction side in FIG. 2 to FIG. 4A) by resisting the urging force of the return spring 106.

The disc portion 70 of the base 68 is formed with a spring mount 118. The spring mount 118 is configured in a substantially disc shape with a smaller diameter than that of the disc portion 70, and is integrally formed to the disc portion 70 so as to be coaxial to the disc portion 70 at the vehicle front side of the disc portion 70. The spring mount 118 of the disc portion 70 of the base 68 is provided with a second clutch spring 120, serving as a motor output shaft-side portion of a friction clutch, or as a clutch member. The second clutch spring 120 is configured by a torsion coil spring. The spring mount 118 is inserted inside a coil portion 122 of the second clutch spring 120, thereby retaining the second clutch spring 120 on the spring mount 118.

One end portion 124 of the second clutch spring 120 is inserted inside a first anchor groove 126 formed on the other of the pair of lever portions 94 of the lever 90. Another end portion 128 of the second clutch spring 120 enters a second anchor groove 130 formed in the block 116 of the disc portion 70 of the base 68.

The coil winding direction of the second clutch spring 120 from the one end portion 124 to the other end portion 128 is configured toward the one side about the base shaft 88 of the base 68 (the arrow C direction side in FIG. 2 and FIG. 3). Accordingly, when the lever 90 swings toward the one side about the base shaft 88 with respect to the base 68, the one end portion 124 of the second clutch spring 120 moves toward the other end portion 128 in the winding direction of the coil portion 122. The second clutch spring 120 therefore undergoes elastic deformation so as to expand (be displaced) toward the radial direction outside of the coil portion 122 (see FIGS. 4B, 4C).

An output gear 132, serving as a spool-side portion or as a rotation member of the friction clutch, is provided at the radial direction outside of the coil portion 122 of the second clutch spring 120. The output gear 132 is formed in a circular cylinder shape. The output gear 132 is disposed coaxially to the base 68, and is supported by the base 68 so as to be capable of rotating relative to the base 68.

Note that as described above, the one end portion 124 of the second clutch spring 120 provided to the base 68 moves toward the other end portion 128 in the winding direction of the coil portion 122 of the second clutch spring 120. The second clutch spring 120 accordingly undergoes elastic deformation so as to expand (be displaced) toward the radial direction outside of the coil portion 122, such that the second clutch spring 120 abuts an inner portion of the output gear 132. Rotation of the base 68 is transmitted to the output gear 132 by frictional force arising between the second clutch spring 120 and the inner portion of the output gear 132. The output gear 132 is accordingly rotated.

Namely, when the motor 40 is driven in reverse (see FIG. 1) and rotation force is input to the third clutch 60 through the first clutch 48, the output gear 132 of the third clutch 60 is rotated toward the other side about the base shaft 88 of the base 68. However, the output gear 132 of the third clutch 60 is not rotated when the motor 40 is driven forward and rotation force is input to the third clutch 60 through the first clutch 48.

Outer teeth are formed to an outer circumferential portion of the output gear 132 of the third clutch 60. The outer teeth of the outer circumferential portion of the output gear 132 engage with the third gear 62 of the second gear train 58. Rotation force transmitted from the first clutch 48 of the first gear train 44 to the third clutch 60 of the second gear train 58 is thus transmitted to the spool 18 through the third gear 62 and the fourth gear 64.

When the motor 40 (see FIG. 1) is driven forward, rotation force is transmitted to the spool 18 through the first gear 46, the first clutch 48, the second gear 50, and the second clutch 52 of the first gear train 44, thereby rotating the spool 18 in the take-up direction. In contrast thereto, when the motor 40 is driven in reverse, rotation force is transmitted to the spool 18 through the first gear 46 and the first clutch 48 of the first gear train 44, and the third clutch 60, the third gear 62, and the fourth gear 64 of the second gear train 58, thereby rotating the spool 18 in the take-up direction. The gear ratio between the output gear 132 of the third clutch 60 and the fourth gear 64 in the second gear train 58 is greater than the gear ratio between the second gear 50 and the second clutch 52 in the first gear train 44.

Note that the motor 40 described above is a DC motor. The DC motor 40 includes an armature functioning as a rotor, and a permanent magnet disposed at the radial direction outside of the armature. The armature also includes an iron core such as a laminated core. Slots are formed in the iron core. The slots open at an outer peripheral face of the iron core, and the slot openings are configured in elongated slit shapes in a direction from one side to the other side along a central axis direction of the armature. Teeth of the iron core are configured between adjacent slots around the circumferential direction of the iron core. Windings are wound around the teeth, and the armature rotates when direct current flows through the windings. The motor 40 is configured with three poles, for example. Moreover, the length direction of the slot openings in the armature of the motor 40 is either the same direction as the central axis direction of the armature, or has a small incline (also known as "skew angle") with respect to the axial center direction of the armature.

In this motor 40, when the output shaft 42 is rotated in a no-current state of the motor 40 (no-current state of the windings), torque that resists the rotation force of the output shaft 42, also known as "cogging torque", arises. The value of the cogging torque fluctuates substantially periodically with the rotation of the output shaft 42 (namely, rotation of the armature).

Note that in the present exemplary embodiment, the maximum value of the cogging torque of the motor 40 is set to no less than the product of the gear ratio from the third clutch 60 to the output shaft 42 of the motor 40, and the maximum frictional force (for example, the maximum static frictional force) between the second clutch spring 120 and the inner portion of the output gear 132 when the lever 90 of the third clutch 60 of the second gear train 58 swings toward the one side about the base shaft 88 (the arrow C direction side in FIG. 2 to FIG. 4A) such that the second clutch spring 120 abuts the inner portion of the output gear 132.

Operation and Advantageous Effects of the Present Exemplary Embodiment

In the present exemplary embodiment, when the webbing 20 is being worn over the body of an occupant seated in the vehicle seat, the webbing 20 is pulled by the occupant, thereby pulling the webbing 20 out from the spool 18. The occupant wraps the webbing 20 pulled out from the spool 18 across the vehicle front side of the body of the occupant. In this state, the tongue provided to the webbing 20 is engaged with the buckle of the seatbelt device.

When the tongue is engaged with the buckle of the seatbelt device, the tongue detection signal output from the buckle switch provided to the buckle and input to the ECU switches from the LOW level to the HIGH level, and the motor 40 is driven forward at a low speed by the ECU. Rotation force of the forward-driven motor 40 is transmitted from the output shaft 42 of the motor 40 to the ratchet wheel 54 through the first gear 46, the first clutch 48, the second gear 50, and the second clutch 52 of the first gear train 44, thereby rotating the ratchet wheel 54 at a low speed in the take-up direction. The spool 18 accordingly rotates at low speed in the take-up direction, taking up the webbing 20 onto the spool 18. Slack is thereby removed from the webbing 20 wrapped across the body of the occupant, fitting the webbing 20 over the body of the occupant.

In this state in which the webbing 20 is fitted over the body of the occupant, when the distance to an obstacle ahead of the vehicle falls below a specific value during travel, the obstacle detection signal output from the forward monitoring device and input to the ECU switches from the LOW level to the HIGH level, and the motor 40 is driven forward at high speed by the ECU. Rotation force of the forward-driven motor 40 is transmitted to the spool 18 through the first gear 46, the first clutch 48, the second gear 50, and the second clutch 52 of the first gear train 44, and the ratchet wheel 54, thereby rotating the spool 18 at high speed in the take-up direction. The webbing 20 is thereby taken up onto the spool 18, further removing slack from the webbing 20 wrapped across the body of the occupant, enabling firm restraint of the body of the occupant by the webbing 20.

When the buckle of the seatbelt device is operated by the occupant, for example, and the engagement between the tongue and the buckle is released, the tongue detection signal output from the buckle switch provided to the buckle and input to the ECU switches from the HIGH level to the LOW level, and the motor 40 is driven in reverse by the ECU. Rotation force of the driven motor 40 being driven in reverse is transmitted from the output shaft 42 of the motor 40 to the input gear 76 of the third clutch 60 in the second gear train 58 through the first gear 46 and the first clutch 48 of the first gear train 44. The input gear 76 is thereby rotated toward the other side about the base shaft 88 of the base 68 (the arrow D direction side in FIG. 2 and FIG. 3).

Rotation force of the input gear 76 of the third clutch 60 is transmitted to the base 68 of the third clutch 60 through the first clutch spring 82 and the rotor plate 72 configuring the third clutch 60. The base 68 accordingly rotates toward the other side about the base shaft 88 (the arrow D direction side in FIG. 2 and FIG. 3). The rotation of the base 68 causes centrifugal force to act on the weights 100 of the third clutch 60, such that the weights 100 swing in the one direction (the arrow E direction in FIG. 2 and FIG. 3) about their respective support shafts 102.

When the weights 100 swing, the lever 90 of the third clutch 60 is swung toward the one side about the base shaft 88 of the base 68 of the third clutch 60 (the arrow C direction side in FIG. 2 and FIG. 3), against the urging force of the return spring 106. The one end portion 124 of the second clutch spring 120 accordingly swings in the direction of winding from the one end portion 124 toward the other end portion 128 of the coil portion 122 of the second clutch spring 120 of the third clutch 60, such that the one end portion 124 of the second clutch spring 120 moves toward the other end portion 128.

The coil portion 122 of the second clutch spring 120 of the third clutch 60 is thereby displaced so as to expand radially outward, and the coil portion 122 of the second clutch spring 120 abuts the inner portion of the output gear 132 of the third clutch 60. The rotation of the input gear 76 of the third clutch 60 toward the other side about the base shaft 88 is thus transmitted to the output gear 132 of the third clutch 60 through the base 68 of the third clutch 60 and the coil portion 122 of the second clutch spring 120. The output gear 132 is thereby rotated toward the other side about the base shaft 88 (the arrow D direction side in FIG. 2 and FIG. 3).

Rotation force of the output gear 132 of the third clutch 60 is transmitted to the spool 18 through the third gear 62 and the fourth gear 64 of the second gear train 58, and through the coupling shaft 66, thereby rotating the spool 18 in the take-up direction. The webbing 20 is thereby taken up and stored on the spool 18. In this manner, in the webbing take-up device 10, reverse drive rotation force of the motor 40 is used to take up and store the webbing 20 on the spool 18, thereby enabling the urging force of the flat spiral spring 30 provided inside the spring housing 28 to be made weaker. This thereby enables a sense of being constrained by the webbing 20 experienced by the occupant as a result of the urging force of the flat spiral spring 30 to be lessened in a state in which the webbing 20 has been fitted over the body of the occupant.

Note that, for example, when the webbing 20 is pulled by the occupant seated in the vehicle seat such that rotation force (rotation load) in the pull-out direction arises in the spool 18, rotation force of the spool 18 in the pull-out direction is transmitted to the output gear 132 of the third clutch 60 of the second gear train 58 through the coupling shaft 66, the fourth gear 64 of the second gear train 58, and the third gear 62 of the second gear train 58. Rotation force toward the one side about the base shaft 88 of the base 68 of the third clutch 60 (the arrow C direction in FIG. 2 and FIG. 3) arises in the output gear 132 as a result.

In such a state in which pull-out direction rotation force has arisen in the spool 18, the coil portion 122 of the second clutch spring 120 of the third clutch 60 is displaced so as to expand radially outward. When this occurs, the output gear 132 attempts to rotate the coil portion 122 of the second clutch spring 120 toward the one side about the base shaft 88 due to frictional force between the inner portion of the output gear 132 and the coil portion 122 of the second clutch spring 120.

When the value of the pull-out direction rotation force of the spool 18 is less than the product of the gear ratio when transmitting rotation from the spool 18 to the output gear 132, and the maximum frictional force (for example, maximum static frictional force) between the output gear 132 and the coil portion 122 of the second clutch spring 120, the rotation force of the output gear 132 is transmitted to the input gear 76 of the third clutch 60 through the second clutch spring 120, the base 68 of the third clutch 60, the rotor plate 72 of the third clutch 60, and the first clutch spring 82 of the third clutch 60. The rotation force transmitted to the input gear 76 is further transmitted to the second gear 50 of the first gear train 44 through the first clutch 48 of the first gear train 44, as rotation force in the same direction as the rotation force during forward drive of the motor 40.

However, the pull-out direction rotation force of the spool 18 transmitted to the first clutch 48 in this manner is transmitted to the output shaft 42 of the motor 40 through the first gear 46 of the first gear train 44. Note that the motor 40 is a DC motor with an iron core. The maximum value of the cogging torque of the motor 40 is set to at least the product of the gear ratio from the third clutch 60 to the output shaft 42 of the motor 40, and the maximum frictional force (for example, maximum static frictional force) between the second clutch spring 120 and the inner portion of the output gear 132.

Accordingly, as described above, when the value of the pull-out direction rotation force of the spool 18 is less than the product of the gear ratio when transmitting rotation from the spool 18 to the output gear 132 and the maximum frictional force between the output gear 132 and the coil portion 122 of the second clutch spring 120, the cogging torque of the motor 40 resists the rotation of the output shaft 42, thereby suppressing rotation of the output shaft 42 as a result of this rotation force. Accordingly, pull-out direction rotation of the spool 18 is suppressed when pull-out direction rotation force of this value arises in the spool 18. In such cases, pull-out direction rotation force of the spool 18 can be suppressed from being transmitted to the second clutch 52 of the first gear train 44 via the second gear train 58, and the clutch pawl 56 of the second clutch 52 can be suppressed from engaging with the ratchet wheel 54.

In contrast thereto, when the value of the pull-out direction rotation force of the spool 18 is greater than or equal to the product of the gear ratio when transmitting rotation from the spool 18 to the output gear 132 of the third clutch 60 and the maximum frictional force between the output gear 132 and the coil portion 122 of the second clutch spring 120 of the third clutch 60, when this rotation force is transmitted to the output gear 132, the output gear 132 is rotated and slips against the second clutch spring 120. Accordingly, in this state, the transmission of rotation force from the output gear 132 to the second clutch spring 120 is cut off. This thereby enables pull-out direction rotation force of this value in the spool 18 to be suppressed from being transmitted to the second clutch 52 of the first gear train 44 via the second gear train 58, and enables the clutch pawl 56 of the second clutch 52 to be suppressed from engaging with the ratchet wheel 54.

Accordingly, in the present exemplary embodiment the clutch pawl 56 of the second clutch 52 can be suppressed from engaging with the ratchet wheel 54 when pull-out direction rotation force arises in the spool 18 in a state in which the coil portion 122 of the second clutch spring 120 of the third clutch 60 has been displaced so as to expand radially outward, and the coil portion 122 has abutted the inner portion of the output gear 132 of the third clutch 60. This thereby enables any deterioration to the sensation experienced by the occupant when attempting to pull out the webbing 20 to be suppressed in a state in which the coil portion 122 of the second clutch spring 120 has abutted the inner portion of the output gear 132.

Moreover, in the present exemplary embodiment, the advantageous effects described above can be obtained by setting the maximum value of the cogging torque of the motor 40 to at least the product of the maximum frictional force (for example the maximum static frictional force) between the second clutch spring 120 of the third clutch 60 and the inner portion of the output gear 132 of the third clutch 60, and the gear ratio from the third clutch 60 to the output shaft 42 of the motor 40. This thereby enables an increase in the number of components of the webbing take-up device 10 to be suppressed.

Note that in the present exemplary embodiment, configuration is made in which the maximum value of the cogging torque of the motor 40 is set to at least the product of the maximum frictional force (for example the maximum static frictional force) between the second clutch spring 120 of the third clutch 60 and the inner portion of the output gear 132 of the third clutch 60 and the gear ratio from the third clutch 60 to the output shaft 42 of the motor 40. However, configuration may be made in which at least one out of the maximum frictional force between the second clutch spring 120 and the inner portion of the output gear 132, or the gear ratio from the third clutch 60 to the output shaft 42 of the motor 40, is set such that the product of the maximum frictional force between the second clutch spring 120 and the inner portion of the output gear 132 and the gear ratio from the third clutch 60 to the output shaft 42 of the motor 40 is no greater than the maximum value of the cogging torque of the motor 40.

Moreover, in the present exemplary embodiment, the length direction of the slot openings in the core of the motor 40 is configured either as the same direction as the central axis direction of the armature, or at a small incline (skew angle) with respect to the central axis direction of the armature. However, this is an example of a configuration to increase the value of the cogging torque of the motor 40, and the motor 40 is not limited to such a configuration so long as the maximum value of the cogging torque of the motor 40 is greater than or equal to the product of the maximum frictional force between the second clutch spring 120 and the inner portion of the output gear 132 and the gear ratio from the third clutch 60 to the output shaft 42 of the motor 40.

Moreover, in the present exemplary embodiment, the motor 40 is configured as a resistance section. However, for example, the weight of at least one out of the rotation force transmitting members, for example the first gear 46, the first clutch 48, the second gear 50, or the second clutch 52 of the first gear train 44, or the third gear 62 or the fourth gear 64 of the second gear train 58, may be set such that the at least one of the rotation force transmitting members is not rotated at a rotation force of a value less than that at which the output gear 132 slips with respect to the second clutch spring 120.

A webbing take-up device of a first aspect includes: a spool that takes up a webbing by rotating in a take-up direction, and that rotates in a pull-out direction opposite to the take-up direction by the webbing being pulled out; a motor that rotates a motor output shaft by driving; a first rotation force transmission mechanism that is capable of transmitting rotation force between the motor output shaft and the spool, and that is capable of rotating the spool in the take-up direction by being input with rotation force of the motor output shaft in a first direction; a second rotation force transmission mechanism that is capable of transmitting rotation force between the motor output shaft and the spool, and that is capable of rotating the spool in the take-up direction by being input with rotation force of the motor output shaft in a second direction opposite to the first direction; a cut-off section that cuts off transmission of rotation load along a rotation force transmission route from the second rotation force transmission mechanism to the spool via the first rotation force transmission mechanism due to the rotation load in the pull-out direction becoming a predetermined value or greater; and a resistance section that resists the rotation load during transmission of the rotation load, and that suppresses transmission of the rotation load along the rotation force transmission route in a case in which the rotation load is less than the predetermined value.

In the webbing take-up device of the first aspect, when rotation load in the pull-out direction of the spool is input to the second rotation force transmission mechanism, the rotation load is transmitted from the second rotation force transmission mechanism to the motor output shaft, thereby rotating the motor output shaft in the first direction. The rotation direction of the motor output shaft is the direction used when rotating the spool in the take-up direction using the first rotation force transmission mechanism.

When the rotation load in the pull-out direction of the spool is the predetermined value or greater, the cut-off section cuts off the transmission of the rotation load along the rotation force transmission route from the second rotation force transmission mechanism to the spool via the first rotation force transmission mechanism. Accordingly, when the rotation load in the pull-out direction of the spool is the predetermined value or greater, even if the rotation load is input to the second rotation force transmission mechanism, the rotation load can be suppressed from being transmitted to the first rotation force transmission mechanism and output from the first rotation force transmission mechanism to the spool.

On the other hand, when the rotation load in the pull-out direction of the spool is less than the predetermined value, the resistance section resists the rotation load, and transmission of the rotation load along the rotation force transmission route is suppressed by the resistance section. Accordingly, when the rotation load in the pull-out direction of the spool is less than the predetermined load, even if the rotation load is input to the second rotation force transmission mechanism, the rotation can be suppressed from being transmitted to the first rotation force transmission mechanism and output from the first rotation force transmission mechanism to the spool.

In this manner, in the webbing take-up device, when rotation in the pull-out direction of the spool is input to the second rotation force transmission mechanism, the rotation can be suppressed from being transmitted to the first rotation force transmission mechanism through the motor output shaft and output from the first rotation force transmission mechanism to the spool.

A webbing take-up device of a second aspect is the webbing take-up device of the first aspect, wherein the resistance section is the motor, and the predetermined value of the rotation load is the product of a gear ratio when transmitting rotation force from the spool to the motor output shaft via the second rotation force transmission mechanism and a maximum value of a cogging torque of the motor.

The webbing take-up device of a second aspect is the webbing take-up device of the first aspect. In the webbing take-up device of the second aspect, the resistance section is the motor; and the predetermined value of the rotation load is a product of a gear ratio of transmitting rotation force from the spool to the motor output shaft via the second rotation force transmission mechanism and a maximum value of a cogging torque of the motor.

Accordingly, when the rotation load in the pull-out direction of the spool is less than the predetermined value, even when rotation load is transmitted to the motor output shaft, rotation of the motor output shaft is suppressed by the cogging torque of the motor. Therefore, the rotation load can be suppressed from being transmitted to the first rotation force transmission mechanism and output from the first rotation force transmission mechanism to the spool in cases in which the rotation load in the pull-out direction of the spool is less than the predetermined value.

The webbing take-up device of a third aspect is the webbing take-up device of the first or second aspect. In the webbing take-up device of the third aspect, the cut-off section is a friction clutch provided at the second rotation force transmission mechanism, and, in an actuated state, the friction clutch is capable of transmitting rotation force between the motor output shaft and the spool using frictional force arising between a portion on a spool side and a portion on a motor output shaft side; and the predetermined value of the rotation load is a product of a gear ratio of transmitting rotation force from the spool to the portion on the spool side and a maximum frictional force between the portion on the spool side and the portion on the motor output shaft side, and the portion on the spool side rotates relative to the portion on the motor output shaft side due to the rotation load of the predetermined value or greater being transmitted to the portion on the spool side.

In the webbing take-up device of the third aspect, the friction clutch is provided to the second rotation force transmission mechanism. In an actuated state of the friction clutch, the friction clutch transmits rotation force between the motor output shaft-side portion and the spool-side portion using frictional force arising between the spool-side portion and the motor output shaft-side portion. Note that in the friction clutch serving as the cut-off section, the predetermined value of the rotation load at which transmission of rotation in the pull-out direction of the spool is cut off is the product of the gear ratio when transmitting rotation force from the spool to the spool-side portion of the friction clutch and the maximum frictional force between the spool-side portion and the motor output shaft-side portion of the friction clutch.

Accordingly, when the value of the rotation load in the pull-out direction of the spool is the predetermined value or greater, the spool-side portion of the friction clutch rotates relative to the motor output shaft-side portion. Therefore, the rotation load can be suppressed from being transmitted to the second rotation force transmission mechanism through the motor output shaft and output from the first rotation force transmission mechanism to the spool in cases in which the rotation load in the pull-out direction of the spool is the predetermined value or greater.

The webbing take-up device of a fourth aspect is the webbing take-up device of the third aspect. In the webbing take-up device of the fourth aspect, the friction clutch includes a moving body that rotates during transmission of rotation force of the motor in the second direction, that moves due to centrifugal force of rotation, and that is urged toward a side that is opposite to a direction of movement due to the centrifugal force, and wherein, in the friction clutch, the portion on the motor output shaft side contacts the portion on the spool side due to the movement of the moving body due to the centrifugal force, and rotation force is transmitted from the portion on the motor output shaft side to the portion on the spool side.

In the webbing take-up device of the fourth aspect, when the moving body of the friction clutch rotates due to rotation force of the motor in the second direction being transmitted to the friction clutch, the moving body moves due to the centrifugal force of this rotation. The motor output shaft-side portion of the friction clutch thus contacts the spool-side portion, such that the rotation force is transmitted from the motor output shaft-side portion to the spool-side portion.

Note that in this webbing take-up device, an urging force urging the moving body of the friction clutch toward the opposite side to the direction of the movement due to centrifugal force is reduced. Accordingly, rotation load in the pull-out direction of the spool can be suppressed from being transmitted to the second rotation force transmission mechanism through the motor output shaft and output from the first rotation force transmission mechanism to the spool, even if the motor output shaft-side portion of the friction clutch contacts the spool-side portion in a state in which centrifugal force is not acting on the moving body.

As described above, the webbing take-up device according to the present disclosure is capable of suppressing pull-out direction rotation force of a spool from being transmitted and output to a first rotation force transmission section via a second rotation force transmission section.

What is claimed is:

1. A webbing take-up device comprising:
a spool that takes up a webbing by rotating in a take-up direction, and that rotates in a pull-out direction opposite to the take-up direction by the webbing being pulled out;
a first rotation force transmission mechanism that is capable of transmitting rotation force to the spool from an end of the spool, and that is capable of mechanically coupling with the spool by being input with rotation force in a first direction in a state in which the first rotation force transmission mechanism couples with the spool, the first rotation force transmission mechanism being capable of rotating the spool in the take up direction;
a second rotation force transmission mechanism that is capable of transmitting rotation force to the spool from the end of the spool, and that is capable of rotating the spool in the take-up direction by being input with rotation force in a second direction opposite to the first direction;
a cut-off section that cuts off transmission of a rotation load in a pull-out direction along a rotation force transmission route from the spool to the second rotation force transmission mechanism to the first rotation force transmission mechanism when the rotation load in the pull-out direction becomes a predetermined value or greater; and
a means for both rotating the spool in a take-up direction and for providing a cut off rotation load to the cut-off section, including a motor having a motor output shaft coupled with the end of the spool by the first rotation force transmission mechanism and the second rotation force transmission mechanism, the motor rotating the motor output shaft when driven, the motor having a pre-selected cogging torque such that a product of a gear ratio of transmission of rotation force from the spool to the motor output shaft via the second rotation force transmission mechanism and a maximum value of the cogging torque becomes the predetermined value of the rotation load that causes the cut-off section to cut off transmission of the rotation load in the pull-out direction.

2. The webbing take-up device of claim 1, wherein:
the cut-off section is a friction clutch provided at the second rotation force transmission mechanism, and, in an actuated state, the friction clutch is capable of transmitting rotation force between the motor output shaft and the spool using frictional force arising between a portion on a spool side and a portion on a motor output shaft side; and
the predetermined value of the rotation load is a product of a gear ratio of transmitting rotation force from the spool to the portion on the spool side and a maximum frictional force between the portion on the spool side and the portion on the motor output shaft side, and the portion on the spool side rotates relative to the portion on the motor output shaft side due to the rotation load of the predetermined value or greater being transmitted to the portion on the spool side.

3. The webbing take-up device of claim 2,
wherein the friction clutch includes a weight that rotates during transmission of rotation force of the motor in the second direction, that moves due to centrifugal force of rotation, and that is urged toward a side that is opposite to a direction of movement due to the centrifugal force, and
wherein, in the friction clutch, the portion on the motor output shaft side contacts the portion on the spool side due to the movement of the weight due to the centrifugal force, and rotation force is transmitted from the portion on the motor output shaft side to the portion on the spool side.

4. A method of operating a webbing take-up device that includes a spool that takes up a webbing by rotating in a take-up direction, and that rotates in a pull-out direction opposite to the take-up direction by the webbing being pulled out; a first rotation force transmission mechanism that is capable of transmitting rotation force to the spool from an end of the spool, and that is capable of mechanically coupling with the spool by being input with rotation force in a first direction in a state in which the first rotation force transmission mechanism couples with the spool, the first rotation force transmission mechanism being capable of rotating the spool in the take up direction; a second rotation force transmission mechanism that is capable of transmitting rotation force to the spool from the end of the spool, and that is capable of rotating the spool in the take-up direction by being input with rotation force in a second direction opposite to the first direction; a cut-off section that cuts off transmission of a rotation load in a pull-out direction along a rotation force transmission route from the spool to the second rotation force transmission mechanism to the first rotation force transmission mechanism when the rotation load in the pull-out direction becomes a predetermined value or greater; and a motor having a motor output shaft coupled with the end of the spool by the first rotation force transmission mechanism and the second rotation force transmission mechanism, the motor rotating the motor output shaft when driven, comprising the step of:

selecting the cogging torque of the motor such that a product of a gear ratio of transmission of rotation force from the spool to the motor output shaft via the second rotation force transmission mechanism and a maximum value of the cogging torque becomes the predetermined value of the rotation load that causes the cut-off section to cut off transmission of the rotation load in the pull-out direction.

* * * * *